J. F. O'CONNOR.
FRICTION SHOCK ABSORBING MECHANISM.
APPLICATION FILED MAR. 12, 1918.
1,302,077.
Patented Apr. 29, 1919.
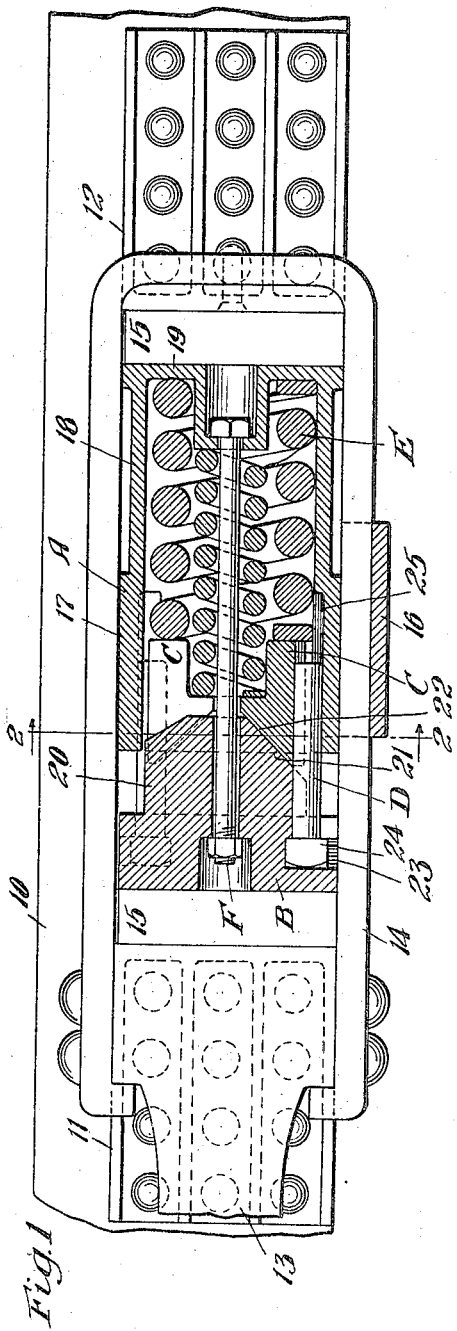
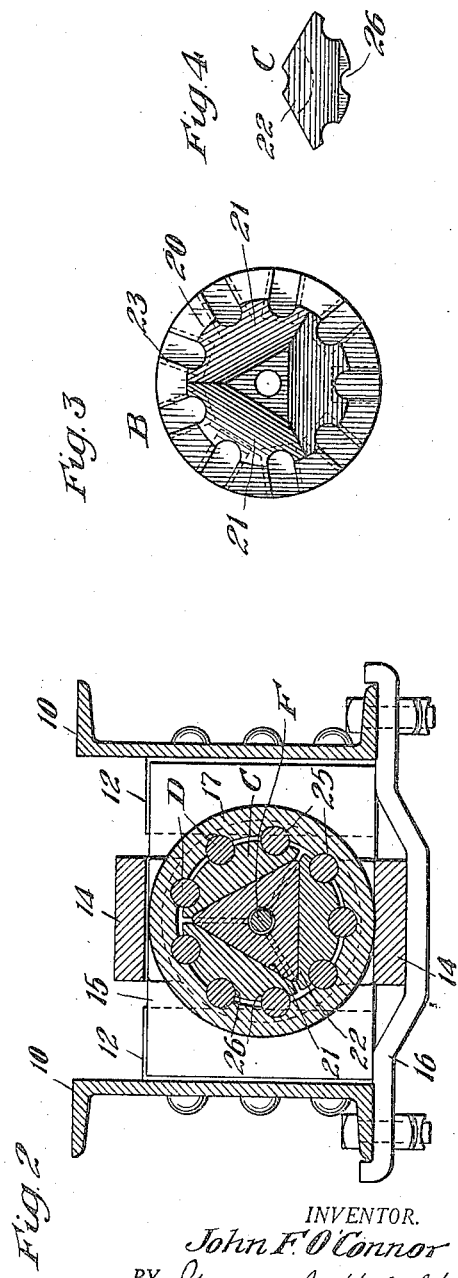
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,302,077.   Specification of Letters Patent.   Patented Apr. 29, 1919.

Application filed March 12, 1918. Serial No. 221,932.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, more particularly adapted for railway draft riggings and wherein the friction shell, wedge and shoes are so formed as to permit their manufacture commercially in the form of castings, preferably malleable castings, to thereby promote cheapness of the structure.

Another and more specific object of the invention is to provide a friction shock absorbing mechanism, so arranged that its elements which are subjected to the greatest wear are readily replaceable.

In the drawing forming part of this specification, Figure 1 is a part elevational view, part vertical, longitudinal section, of a railway draft rigging showing my improvements in connection therewith. Fig. 2 is a vertical, transverse, sectional view, taken substantially on the line 2—2 of Fig. 1. Fig. 3 is an inner end elevational view of the wedge. And Fig. 4 is an end view of one of the shoes.

In said drawing, 10—10 denote the draft sills of the car to which are secured front and rear stops 11 and 12. The draw bar 13 is operatively connected to the shock absorbing mechanism proper by any suitable means, such as the yoke 14. The shock absorbing mechanism is disposed between front and rear followers 15—15 and all the parts may be supported by a saddle plate 16.

The shock absorbing mechanism proper, as shown, comprises a casting A, a pressure-transmitting member B, a plurality of shoes C—C, a series of friction elements D—D, a main spring E, and a retaining bolt F.

The casting A is of substantially cylindrical form and combines a friction shell proper 17 at its forward end, a spring casing 18 and a rear wall 19.

The pressure-transmitting member B bears against the front follower 15 and on its inner face has an integral wedge 20 preferably formed with three wedge faces 21—21. The wedge faces 21 coöperate with corresponding wedge faces 22—22 formed on the shoes C—C, there being also three shoes to correspond to the number of wedge faces 21. The spring E comprises preferably an outer heavy coil and an inner nested coil, said coils bearing at their rear ends against the casting A and at their forward ends against the shoes C.

Around the periphery of the pressure member B and on the inner side thereof, said member B is provided with a series of radially extending under-cut slots or grooves 23, each of which is adapted to receive the head 24 of a friction element D. The friction elements D will preferably consist of tempered bolt blanks which can be readily obtained. Each of the bolt blanks or friction elements D is extended within the friction shell 17, the latter being provided with a corresponding series of longitudinally extending grooves 25—25 to accommodate the bolt blanks and the outer faces of the shoes C are similarly grooved, as indicated at 26—26.

Upon compressive action of the shock absorbing mechanism, it is evident that the friction elements D will move in unison with the pressure member B. As the pressure member B moves inwardly with respect to the shell 17, the shoes C will be forced inwardly and simultaneously radial pressure will be exerted thereagainst due to the coöperation of the wedge faces 21 and 22. The radial pressure from the shoes C will, of course, increase the friction between the friction elements D and the shell 17.

With the construction herein described, it is evident that the pressure-transmitting element B, the shoes C and the combined friction shell and spring casing may be made in the form of malleable castings and the friction elements D can be readily replaced at small expense. Furthermore, the use of the detachable friction elements D permits of the use of two kinds of metal in generating friction which is one of the desirable features of an efficient friction gear.

I claim:

1. In a friction shock absorbing mechanism, the combination with a friction shell, of a wedge, a plurality of friction elements movable in unison with and attached to the wedge all of said elements having direct frictional engagement with the shell, shoes having wedge faces coöperable with said wedge, said shoes co-acting with said elements to force the latter against the shell, and spring means resisting relative movement between the shell and shoes.

2. In a friction shock absorbing mechanism, the combination with a friction shell, of a wedge, a plurality of friction elements movable in unison with the wedge and having frictional engagement with the shell, shoes having wedge faces coöperable with said wedge, said shoes co-acting with said elements to force the latter against the shell, and spring means resisting relative movement between the shell and shoes, said elements being detachably connected to said wedge.

3. In a friction shock absorbing mechanism, the combination with a friction shell, of a wedge, a plurality of friction elements movable in unison with the wedge and having frictional engagement with the shell, shoes having wedge faces coöperable with said wedge, said shoes co-acting with said elements to force the latter against the shell, and spring means resisting relative movement between the shell and shoes, said elements comprising a plurality of rod-like extensions from the wedge, the shell and shoes being grooved to accommodate said elements.

4. In a shock absorbing mechanism, the combination with a friction shell, of a pressure-transmitting member, a series of friction elements movable in unison with said member and slidable within the shell, a wedge, wedge-shaped shoes coöperable with and directly engaging said wedge and adapted to directly engage and force each of said elements directly against the friction shell, and spring means for resisting relative movement between the shell and shoes.

5. In a shock absorbing mechanism, the combination with a friction cylinder and spring casing, of a spring within said casing, a pressure-transmitting member, a series of spaced friction elements movable in unison with said member and slidably engaging said shell, a wedge movable in unison with the pressure-transmitting member, and a series of wedge-shaped shoes co-acting with said wedge and with said friction elements to force the latter against the shell, said spaced friction elements being disposed circularly around the wedge.

6. In a shock absorbing mechanism, the combination with a friction shell, of a pressure-transmitting member having an integrally formed wedge, a plurality of headed, rod-like friction elements detachably connected with said member and movable in unison therewith, said shell being longitudinally grooved on its inner face to accommodate said elements, a plurality of shoes having wedge faces coöperating with said wedge, said shoes being longitudinally grooved on their outer faces to accommodate said elements, and spring means for resisting relative movement between said shoes and said shell.

In witness that I claim the foregoing I have hereunto subscribed my name this 26th day of Feb., 1918.

JOHN F. O'CONNOR.

Copies of this patent may be obtained for five cents each, by addressing the "Commissioner of Patents, Washington, D. C."